US012379076B1

(12) United States Patent
Ye

(10) Patent No.: US 12,379,076 B1
(45) Date of Patent: Aug. 5, 2025

(54) INTELLIGENT LED LAMP

(71) Applicant: Xiaodong Ye, Wenzhou (CN)

(72) Inventor: Xiaodong Ye, Wenzhou (CN)

( * ) Notice: Subject to any disclaimer, the term of this patent is extended or adjusted under 35 U.S.C. 154(b) by 0 days.

(21) Appl. No.: 19/082,107

(22) Filed: Mar. 17, 2025

(30) Foreign Application Priority Data

Feb. 17, 2025 (CN) ........................ 202520253839.X

(51) Int. Cl.
*F21K 9/238* (2016.01)
*F21K 9/232* (2016.01)
*F21V 23/00* (2015.01)
*F21V 29/83* (2015.01)
*F21Y 107/30* (2016.01)
*F21Y 113/13* (2016.01)
*F21Y 115/10* (2016.01)

(52) U.S. Cl.
CPC .............. *F21K 9/238* (2016.08); *F21K 9/232* (2016.08); *F21V 23/006* (2013.01); *F21V 29/83* (2015.01); *F21Y 2107/30* (2016.08); *F21Y 2113/13* (2016.08); *F21Y 2115/10* (2016.08)

(58) Field of Classification Search
CPC .......... F21K 9/238; F21K 9/232; F21V 29/83; F21V 23/006; F21Y 2107/30; F21Y 2113/13; F21Y 2115/10
See application file for complete search history.

(56) References Cited

U.S. PATENT DOCUMENTS

| | | | | |
|---|---|---|---|---|
| 10,887,965 B1 * | 1/2021 | Chen | ..................... | F21V 23/003 |
| 11,612,029 B2 * | 3/2023 | Harte | ................. | H05B 45/3574 |
| 11,774,045 B2 * | 10/2023 | Van Bommel | ...... | H01L 25/0753 362/231 |
| 2018/0219147 A1 * | 8/2018 | Ogata | ................... | F21V 29/502 |
| 2021/0381685 A1 * | 12/2021 | Goto | ....................... | F21V 29/70 |

FOREIGN PATENT DOCUMENTS

CN 211952567 U 11/2020

* cited by examiner

*Primary Examiner* — Bao Q Truong
(74) *Attorney, Agent, or Firm* — JEEN IP LAW, LLC

(57) ABSTRACT

Disclosed in the present disclosure is an intelligent light-emitting diode (LED) lamp, which belongs to the technical field of lighting devices. The lamp is composed of a lamp base and a lamp body, where a control circuit board, a storage battery, a transformer and LED lamp bead arrays having at least two different color temperatures are arranged in the lamp body, and a first LED lamp bead array with a higher color temperature and a second LED lamp bead array with a lower color temperature are alternately distributed row by row. The control circuit board includes a main control module, a driving module and a power management module, so as to achieve control over a light emitting mode of lamp beads and power supply to each module.

9 Claims, 6 Drawing Sheets

INTELLIGENT LED LAMP

CROSS-REFERENCE TO RELATED APPLICATIONS

This application claims priority to Chinese Patent Application No. 202520253839.X, filed on Feb. 17, 2025, which is hereby incorporated by reference in its entirety.

TECHNICAL FIELD

The present disclosure relates to the technical field of lighting devices, and in particular to an intelligent light-emitting diode (LED) lamp.

BACKGROUND

A traditional light-emitting diode (LED) lamp has a single function and usually only provides lighting with a single color temperature, which cannot meet diversified needs of a user for lighting color temperatures in different scenes. For example, when reading work, the user may need cool white light with a higher color temperature to provide clear and bright lighting, while when the user relaxes, warm yellow light with a lower color temperature can create a more comfortable atmosphere. Moreover, in terms of power supply modes, most of the power supply modes rely on mains power supply. Once the mains power supply is interrupted, the lamp cannot work normally and lack emergency lighting capability, which will bring inconvenience to the user in some cases of sudden power failure. Further, the control mode of the traditional lamp is also limited to a certain extent, and operation is not convenient and fast enough. Generally, only simple switch control can be carried out through a manual switch, and flexible and diversified adjustment cannot be realized.

Therefore, it is of great practical significance to develop an intelligent LED lamp that can provide multiple color temperature options, has dual power supply modes and is convenient and fast to operate.

A multifunctional lamp is disclosed in the Chinese patent with the publication No. CN211952567U, which has a single light emitting mode, only one charging mode and no remote control function, and still cannot well meet the diversified needs of the user in actual use.

SUMMARY

The present disclosure overcomes the above technical defects by employing the following technical solutions:

An intelligent light-emitting diode (LED) lamp, including a lamp base 1 and a lamp body 2, where a control circuit board 3, a storage battery 4, a transformer 5 and LED lamp bead arrays integrating at least two different color temperature characteristics are arranged in the lamp body 2, the LED lamp bead arrays at least include: a first LED lamp bead array 6 with a higher color temperature and a second LED lamp bead array 7 with a lower color temperature, and the first LED lamp bead array 6 and the second LED lamp bead array 7 are alternately distributed on the lamp body 2 row by row.

Preferably, the control circuit board 3 includes a main control module 31, a driving module 32 and a power management module 33, the main control module 31 is electrically connected to each LED lamp bead array and controls a light emitting mode of the LED lamp bead array through the driving module 32, and the power management module 33 supplies power to each circuit module.

Preferably, the main control module 31 is electrically connected to a key 311 and an infrared receiving module 312.

Preferably, the driving module 32 includes two metal-oxide-semiconductor field-effect (MOS) transistor driving branches arranged in parallel, which are a first MOS transistor driving branch 321 and a second MOS transistor driving branch 322 respectively. The first MOS transistor driving branch 321 includes a MOS transistor Q2, a resistor R6, a resistor R11, and a resistor R12. One end of the resistor R6 is connected to a gate electrode of the MOS transistor Q2, and the other end of the resistor R6 is grounded. The resistor R9 and the resistor R10 are connected in parallel. One end formed after the resistor R9 and the resistor R10 are connected in parallel is connected to a drain electrode of the MOS transistor Q2, and the other end formed after the resistor R9 and the resistor R10 are connected in parallel is connected to a port W− of one LED lamp bead array. The second MOS transistor driving branch 322 includes a MOS transistor Q3, a resistor R7, a resistor R13, and a resistor R14. One end of the resistor R7 is connected to a gate electrode of the MOS transistor Q3, and the other end of the resistor R7 is grounded. The resistor R13 and the resistor R14 are connected in parallel. One end formed after the resistor R13 and the resistor R14 are connected in parallel is connected to a drain electrode of the MOS transistor Q3, and the other end formed after the resistor R13 and the resistor R14 are connected in parallel is connected to a port Y− of another LED lamp bead array, thereby realizing accurate driving to the LED lamp bead arrays.

Preferably, the power management module 33 includes a transformer interface circuit 331 electrically connected to the transformer 5, and a power management circuit 332 electrically connected to an output end of the transformer interface circuit 331, the power management circuit 332 includes a charging management chip U1 and a charging interface circuit 333 capable of being connected into an external power supply, and the transformer interface circuit 331 or the charging interface circuit 333 charges the storage battery 4 through the charging management chip U1.

Preferably, the charging management chip U1 is connected to a first LED indicator LED1 for indicating a charging state and a second LED indicator LED2 for indicating a fully charged state respectively.

Preferably, the transformer interface circuit 331 includes a transformer interface P3 and a voltage detection sub-circuit 330, and the voltage detection sub-circuit 330 includes a fourth resistor R9, a fifth resistor R10 and a first diode D2. One end formed after the fourth resistor R9 and the fifth resistor R10 are connected in series is connected to an anode of the first diode D2, the other end formed after the fourth resistor and the fifth resistor are connected in series is grounded, and a connection point between the fourth resistor R9 and the fifth resistor R10 is connected to an input pin of the main control module 31.

Preferably, a detachable and transparent lampshade 21 is arranged at an upper portion of the lamp body 2, a plurality of annularly and uniformly distributed heat dissipation holes 211 are provided at a top of the lampshade 21, and a sleeve 22 is arranged inside the lampshade. A charging port 23 into which an external power supply is capable of being inserted is provided at a lower portion of the lamp body 2, and a light passing hole 24 for observing bright light of an indicator is provided near the charging port 23. A switch port 25 through which the key 311 may be pressed and an infrared receiving port 26 for receiving an infrared signal are also be provided on a same circumferential surface of the charging port 23.

Preferably, the first LED lamp bead array 6 and the second LED lamp bead array 7 are arranged around a peripheral side surface and a top surface of the sleeve 22, lamp beads of different LED lamp bead arrays are arranged alternately row by row on the peripheral side surface of the sleeve 22, the lamp beads of a same row have the same color temperature, and the lamp beads of a same column are alternately distributed according to different color temperatures.

Preferably, the control circuit board 3 is in an annular structure, is arranged around the storage battery 4 in a circumferential direction, and is located at a lower portion of the lamp body 2.

Compared with the prior art, the present disclosure has the beneficial effects as follows:

1. Function of meeting diversified lighting demands: by integrating a variety of LED lamp bead arrays with different color temperature characteristics, the diversified demands of a user on lighting color temperatures in different scenes can be met, different LED lamp bead arrays are arranged around the surface and the top surface of the sleeve in a unique way in which adjacent lamp beads are alternately arranged, and a uniform light mixing distribution structure is formed. This innovative arrangement ensures that light of different color temperatures is fully mixed in an emission process, thereby avoiding problems such as uneven light and color deviation, providing the user with a softer, more comfortable and visually good lighting environment, and meeting needs for high-quality lighting of the user.

2. Dual power supply modes and intelligent switching: the lamp is provided with a threaded lamp base in which a Type-C interface is connected to a direct current (DC) interface. The Type-C interface is suitable for a common charging device, and charging can be carried out at any time. The threaded lamp base is suitable for lamp holders of E27 and E14, such that fixation can be realized through screwing, stable power supply is achieved, and various scenes can be handled. Moreover, the power management unit has the function of performing automatic switching between mains power supply and storage battery power supply, and the storage battery power supply can be automatically switched when the mains power supply is interrupted to ensure normal lighting of the lamp.

3. Convenient and fast operation: an integrated control module is provided with a variety of functional units, such as an infrared remote control receiving unit and a manual control switch, such that operation of the lamp is more convenient and faster, the user can choose the appropriate control mode according to needs, remote control can be realized by using an infrared remote control or direct operation is carried out through the manual control switch.

4. Optimized structure design: reasonable structure design is achieved, for example, the control circuit board is arranged at the lower portion of the lamp body around the storage battery in the circumferential direction. Such layout makes full use of an internal space of the lamp body, which makes the structure of the lamp more compact, reduces occupation of the internal space, and improves an overall beautiful outlook. Furthermore, an electrical connection distance between the integrated control circuit board and the storage battery is shortened, which is conducive to efficient electrical connection and stable signal transmission between the integrated control circuit board and the storage battery, reduces signal interference and transmission loss, and improves overall performance and stability of the lamp.

DESCRIPTION OF EMBODIMENTS

Figure 1:
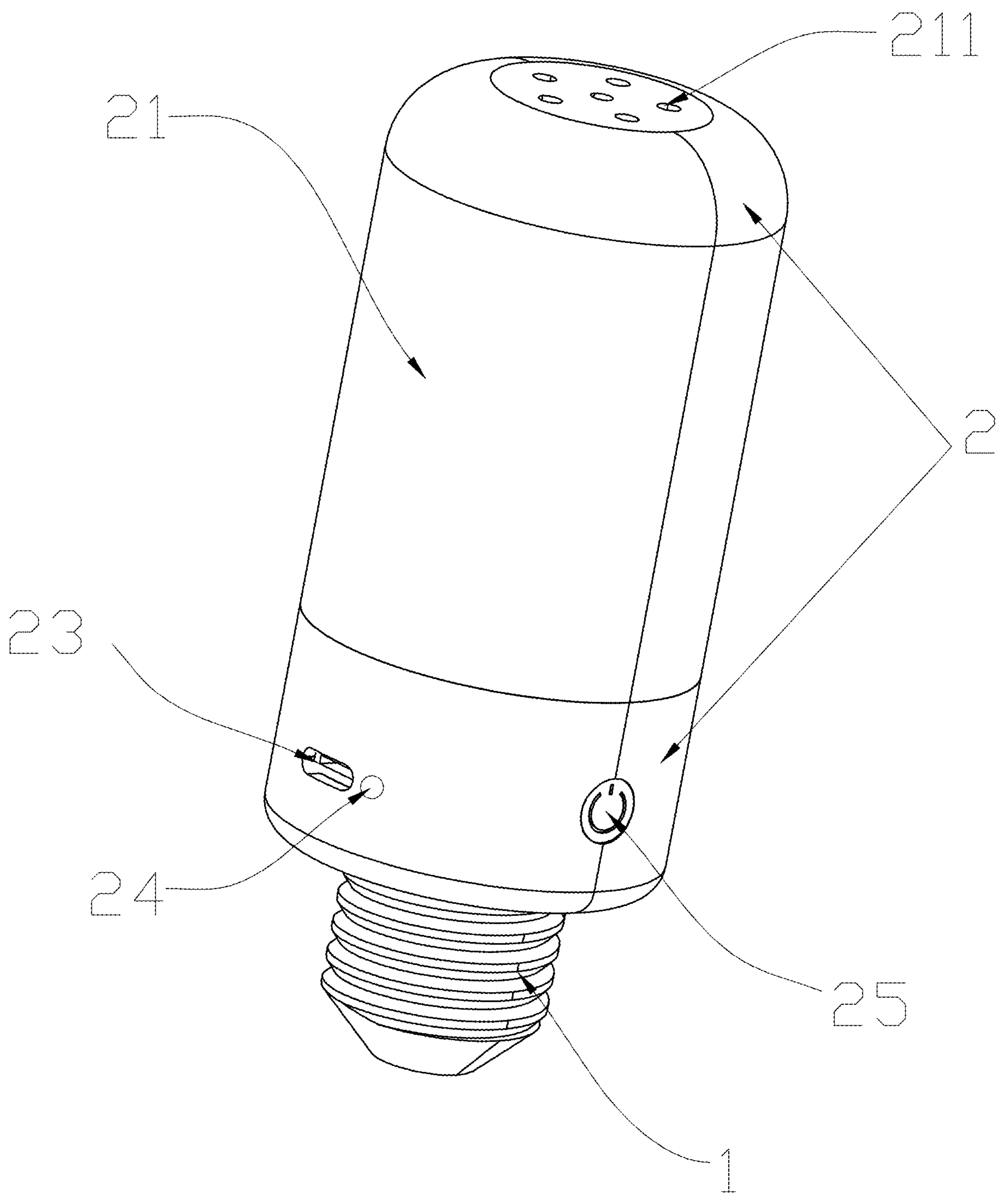
FIG. 1 is a schematic diagram of an integral structure of the present disclosure.
Figure 2:
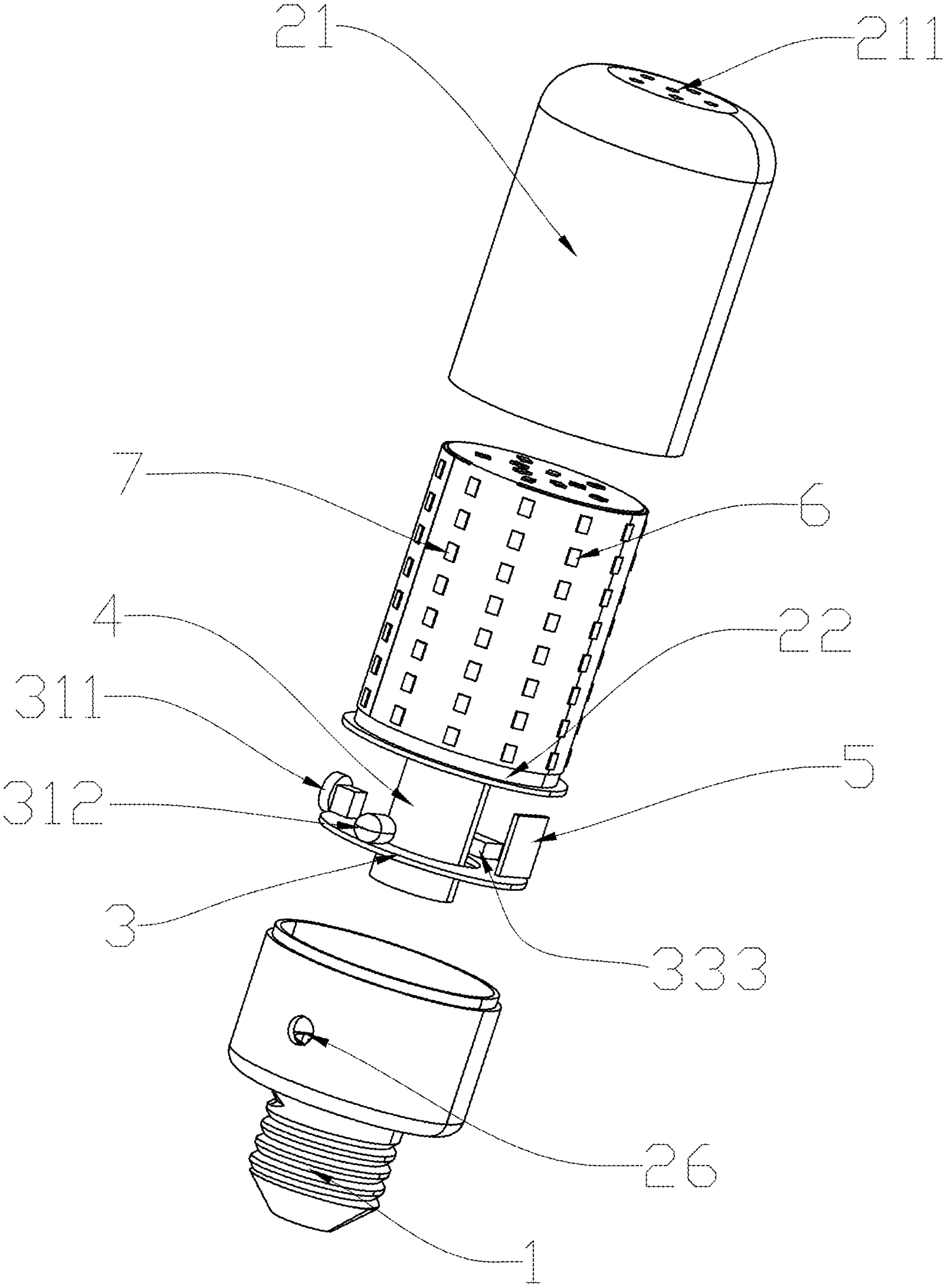
FIG. 2 is a schematic diagram of an integral exploded structure of the present disclosure.
Figure 3:
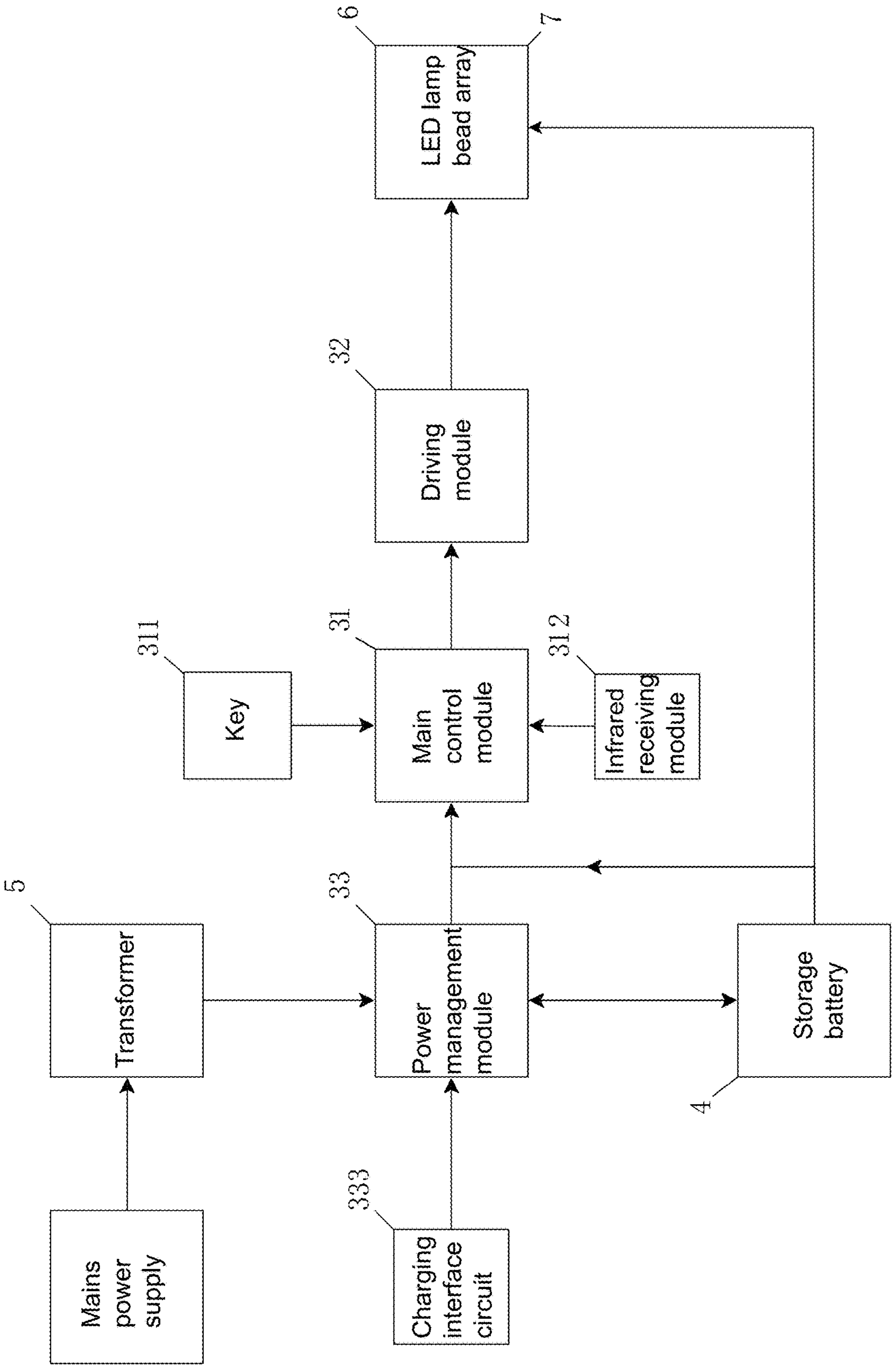
FIG. 3 is a flow diagram of a circuit principle framework of the present disclosure.
Figure 4:
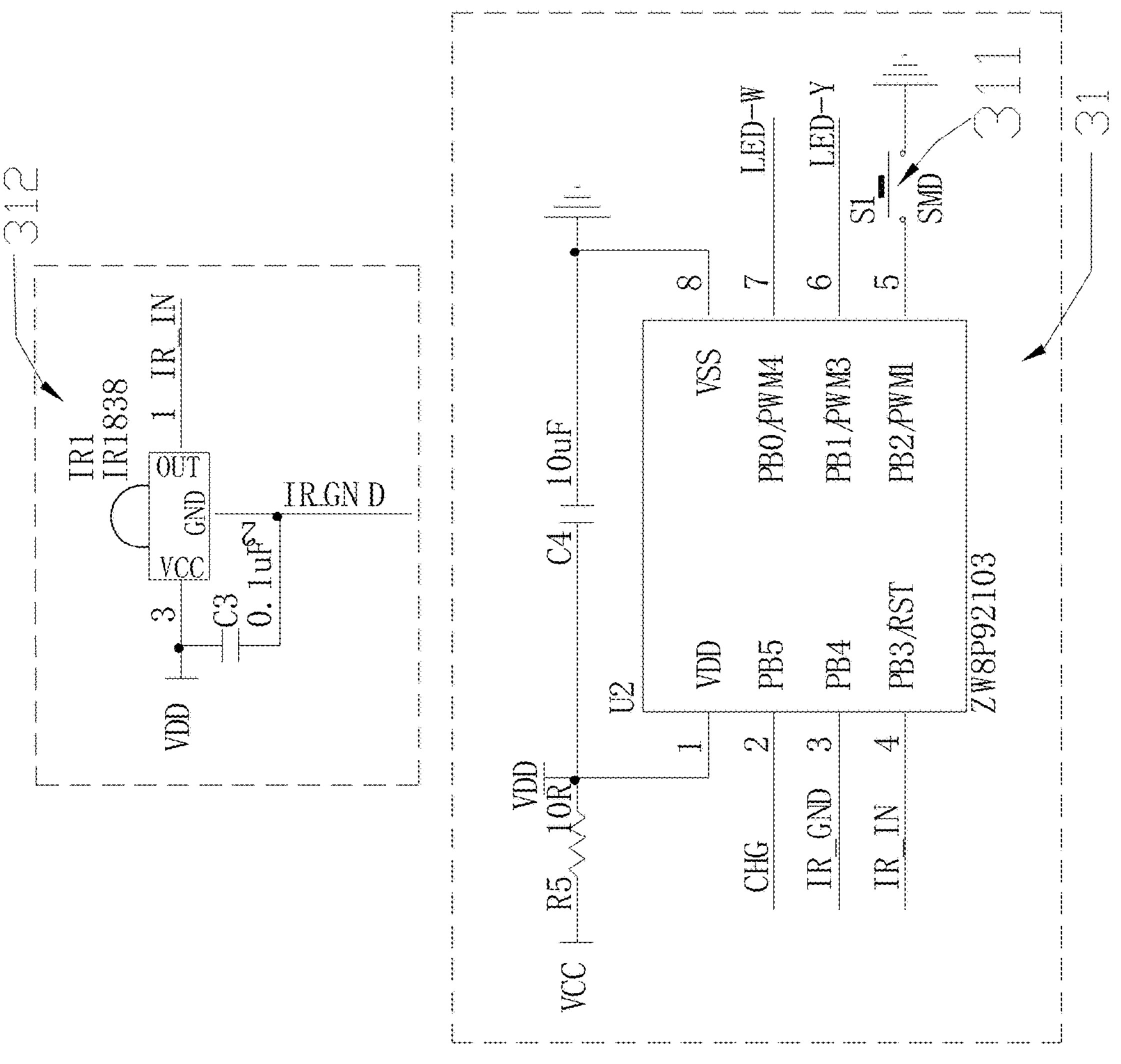
FIG. 4 is a schematic circuit diagram of a main control module of the present disclosure.
Figure 5:
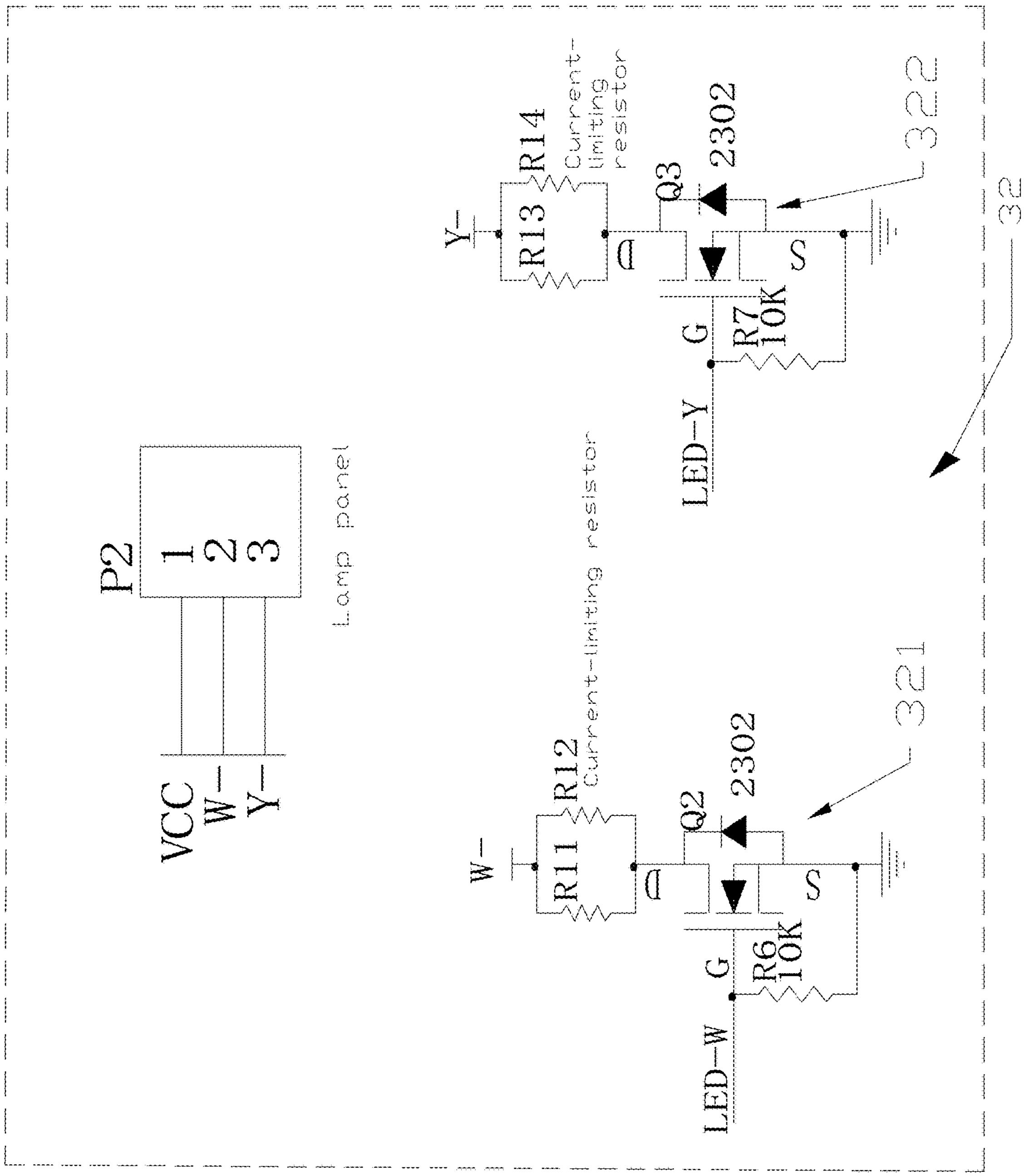
FIG. 5 is a schematic circuit diagram of a driving module of the present disclosure.
Figure 6:
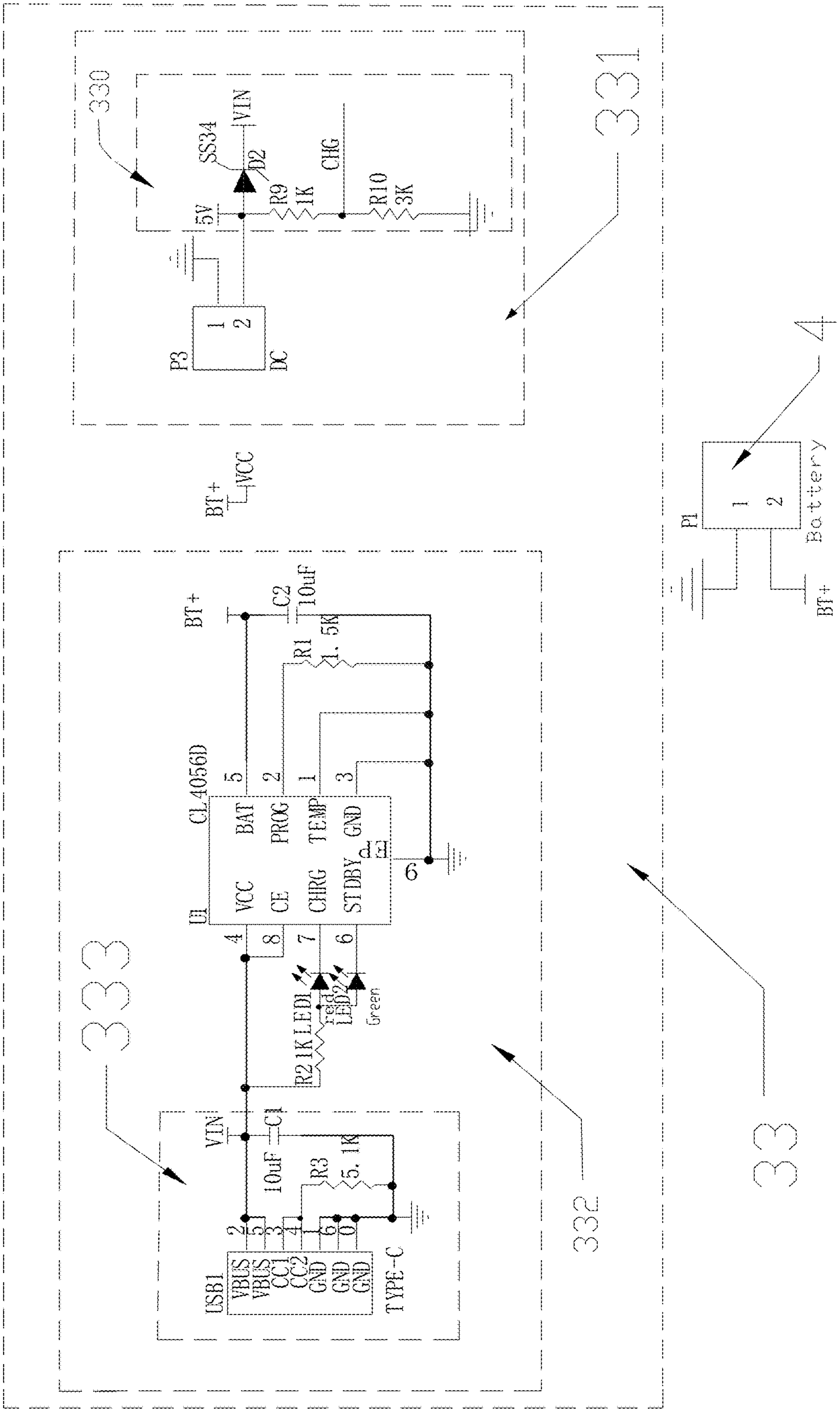
FIG. 6 is a schematic circuit diagram of a power management module of the present disclosure.

The present disclosure will be further described in detail below with reference to the accompanying drawings and particular examples:

(I) Normal Use of Lamp

When mains power supply is in a normal state, the mains power supply is firstly connected to a transformer 5 through a lamp base 1, and the transformer 5 converts high-voltage alternating current power into direct current power suitable for the lamp according to an electromagnetic induction principle. The converted direct current power passes through a transformer interface circuit 331 and smoothly enters a power management module 33.

In the power management module 33, a power management circuit 332 plays a key role in distribution and regulation. The power management circuit provides stable and continuous power supply for each circuit module inside the lamp, including a main control module 31, a driving module 32, etc., so as to ensure normal operation of each module, and further ensure that the lamp can emit light and illuminate according to a preset function. Moreover, the power management circuit 332 charges a storage battery 4 through a charging management chip U1. The charging management chip U1 intelligently adjusts a charging current and voltage according to a real-time electric quantity state of the storage battery 4, so as to realize an efficient and safe charging process.

In the meantime, the user can choose an operation mode according to needs. If manual operation is selected, a command signal can be sent to the main control module 31 by pressing a key 311, and if remote control is preferred, an infrared remote control can be used for sending a command to an infrared receiving module 312. After the main control module 31 receives the command, a main control chip U2 inside the main control module quickly analyzes the command, generates a corresponding precise control signal according to an analysis result, and sends the precise control signal to a first LED bead array 6 and a second LED bead array 7 through the driving module 32. A metal-oxide-semiconductor field-effect (MOS) transistor driving branch 321 in the driving module 32 accurately drives the corresponding LED lamp bead array to emit light according to the received control signal. Specifically, the control signal output by the main control chip U2 is transmitted to a gate electrode of a first MOS transistor Q2 through a first resistor R6 to control on and off states of the first MOS transistor Q2. When the first MOS transistor Q2 is in the on state, a current flows through a second resistor R9 and a third resistor R10 in sequence, so as to drive the first LED bead array 6 to emit light. By adjusting parameters such as a duty cycle of the control signal, a ratio of brightness of the first LED lamp bead array 6 to brightness of the second LED lamp bead array 7 can be accurately adjusted, so as to realize adjustment of different light emitting modes and color temperatures.

It is worth mentioning that the first LED lamp bead array 6 and the second LED lamp bead array 7 are arranged around a peripheral side surface and a top surface of a sleeve 22. On the peripheral side surface of the sleeve 22, lamp beads are arranged alternately in rows, the lamp beads in a same row have the same color temperature, and the lamp beads in a same column are alternately distributed with different color temperatures. On the top surface, the lamp beads with different color temperatures are alternately distributed in a concentric annular arrangement manner. This arrangement allows light of different color temperatures to be mixed well during propagation. For example, in a reading scene, the main control module 31 controls the first LED lamp bead array 6 with a higher color temperature to have higher brightness. Due to the unique arrangement of the first LED lamp bead array and the second LED lamp bead array 7 with a lower color temperature, clear and uniform bright illumination can still be provided for the user after light mixing. In a rest scene, the brightness of the first LED lamp bead array 6 is reduced, and the brightness of the second LED lamp bead array 7 is increased to create a comfortable and soft warm light environment to meet the light demands of the user in different scenes.

(II) Charging State Indication

In a charging process of the storage battery 4, the charging management chip U1 monitors a charging state of the storage battery 4 in real time, and accurately controls on and off states of a first LED indicator LED1 and the second LED lamp bead array 7 according to a monitoring result. When the storage battery 4 is in a charging stage, the charging management chip U1 controls the first LED indicator LED1 to light up to visually inform the user that charging is in progress. With the progress of the charging process, when charge of the storage battery 4 reaches a set full charge threshold, the charging management chip U1 automatically stops the charging operation, and controls a second LED indicator LED2 to light up to clearly indicate to the user that the storage battery 4 is successfully fully charged.

The user can conveniently observe the on and off states of the first LED indicator LED1 and the second LED indicator LED2 through a light passing hole 20 provided at the lower portion of the lamp body 2, thereby grasping the charging condition of the storage battery 4 in real time and reasonably arranging use and charging time of the lamp.

(III) Mains Power Supply Interruption Emergency

In an emergency of main power supply interruption, the power management module 33 quickly senses the interruption of lamp holder power supply by virtue of internal precise detection and circuit switching, and automatically and seamlessly achieve switching to a storage battery 4 power supply mode. In this case, the storage battery 4 acts as an emergency power supply to release stored electric energy, continuously provide power support for each circuit module of the lamp, ensure that the lamp can continue to illuminate normally, and guarantee the basic lighting demand of the user in a power failure environment.

During a power supply period of the storage battery 4, the user can still operate the lamp through the manual control over the key 311 or the infrared remote control as if the mains power supply is normal. The main control module 31, the driving module 32 and other circuit modules work normally under the power supply of the storage battery 4 to maintain various functions of the lamp, such as turning on and off the lamp and adjusting the brightness and color temperature, thereby minimizing inconvenience caused by power failure to the user.

(IV) Heat Dissipation and Maintenance

During the normal operation of the lamp, the LED lamp beads, as main light-emitting elements, will generate a certain amount of heat in the process of converting electrical energy into light energy. If these heat cannot be dissipated in time, an internal temperature of the lamp will be caused to rise, affecting luminous efficiency and service lives of the LED lamp beads, and overall performance of the lamp. In this case, a plurality of heat dissipation holes 211 provided at a top of a lampshade 21 and distributed annularly and uniformly play a key role. Hot air follows the principle of thermal convection, and naturally exchanges with cold air outside through the heat dissipation holes 211, so as to effectively dissipate the heat inside the lamp, reduce the internal temperature of the lamp, ensure that the LED lamp beads always work in an appropriate temperature environment, prolong the service lives of the lamp beads, and maintain the stable performance of the lamp.

In addition, when the lamp needs cleaning or maintenance, the user can easily disassemble the lampshade 21 on an upper portion of the lamp body 2. This detachable design provides a convenient and fast operation space for the user, and the user can conveniently clean, inspect and repair the LED lamp bead arrays, the integrated control circuit board 3 and other components inside the lamp body 2 to ensure that the lamp always maintains a good working condition and improve use experience and a service life of the lamp.

To sum up, the intelligent LED lamp of the present disclosure successfully realizes lighting selection of multiple color temperatures, dual power supply modes and convenient and fast operation modes through reasonable structural design, precise circuit layout and an intelligent control strategy, and has excellent heat dissipation performance and good maintainability, which comprehensively meets the diversified lighting demands of the user in modern life.

The above descriptions are merely preferred examples of the present disclosure, and are not intended to limit the concept and scope of the present disclosure. Various variations and modifications made by those of ordinary skill in the art to the technical solutions of the present disclosure without departing from the design spirit of the present disclosure shall fall within the protection scope of the present disclosure. The technical content required for protection by the present disclosure has been fully described in the claims.

What is claimed is:

1. An intelligent light-emitting diode (LED) lamp, comprising a lamp base and a lamp body, wherein a control circuit board, a storage battery, a transformer and LED lamp bead arrays integrating at least two different color temperature characteristics are arranged in the lamp body, the LED lamp bead arrays at least comprise: a first LED lamp bead array with a higher color temperature and a second LED lamp bead array with a lower color temperature, and the first LED lamp bead array and the second LED lamp bead array are alternately distributed on the lamp body row by row;

wherein the control circuit board is in an annular structure, is arranged around the storage battery in a circumferential direction, and is located at a lower portion of the lamp body.

2. The intelligent LED lamp according to claim 1, wherein the control circuit board comprises a main control module, a driving module and a power management module, the main control module is electrically connected to each LED lamp bead array and controls a light emitting mode of the LED lamp bead array through the driving module, and the power management module supplies power to each circuit module.

3. The intelligent LED lamp according to claim 2, wherein the main control module is electrically connected to a key module and an infrared receiving module.

4. The intelligent LED lamp according to claim 2, wherein the driving module comprises a plurality of metal-oxide-semiconductor field-effect (MOS) transistor driving branches arranged in parallel, each MOS transistor driving branch comprises a first MOS transistor, a first resistor, a second resistor and a third resistor, one end of the first resistor is connected to a gate electrode of the first MOS transistor, and the other end of the first resistor is grounded;

the second resistor and the third resistor are connected in parallel; and one end formed after the second resistor and the third resistor are connected in parallel is connected to a drain electrode of the first MOS transistor, and the other end formed after the second resistor and the third resistor are connected in parallel is connected to an input end of one LED lamp bead array.

5. The intelligent LED lamp according to claim 2, wherein the power management module comprises a transformer interface circuit electrically connected to the transformer, and a power management circuit electrically connected to an output end of the transformer interface circuit, the power management circuit comprises a charging management chip and a charging interface circuit capable of being connected into an external power supply, and the transformer interface circuit or the charging interface circuit charges the storage battery through the charging management chip.

6. The intelligent LED lamp according to claim 5, wherein the charging management chip is connected to a first LED indicator for indicating a charging state and a second LED indicator for indicating a fully charged state respectively.

7. The intelligent LED lamp according to claim 5, wherein the transformer interface circuit comprises a transformer interface and a voltage detection sub-circuit, the voltage detection sub-circuit comprises a fourth resistor, a fifth resistor and a first diode, one end formed after the fourth resistor and the fifth resistor are connected in series is connected to an anode of the first diode, the other end formed after the fourth resistor and the fifth resistor are connected in series is grounded, and a connection point between the fourth resistor and the fifth resistor is connected to the main control module.

8. The intelligent LED lamp according to claim 1, wherein a detachable and transparent lampshade is arranged at an upper portion of the lamp body, a plurality of annularly and uniformly distributed heat dissipation holes are provided at a top of the lampshade, and a sleeve is arranged inside the lampshade;

a charging port into which an external power supply is capable of being inserted is provided at a lower portion of the lamp body, and a light passing hole for observing bright light of an indicator is provided near the charging port; and a key switch port and an infrared receiving port for receiving an infrared signal are also provided on a same circumferential surface of the charging port.

9. The intelligent LED lamp according to claim 8, wherein the first LED lamp bead array and the second LED lamp bead array are arranged around a peripheral side surface and a top surface of the sleeve, lamp beads of different LED lamp bead arrays are arranged alternately row by row on the peripheral side surface of the sleeve, the lamp beads of a same row have the same color temperature, and the lamp beads of a same column are alternately distributed according to different color temperatures.

* * * * *